(No Model.)
W. CAVERT.
EMERY WHEEL.
No. 376,854. Patented Jan. 24, 1888.
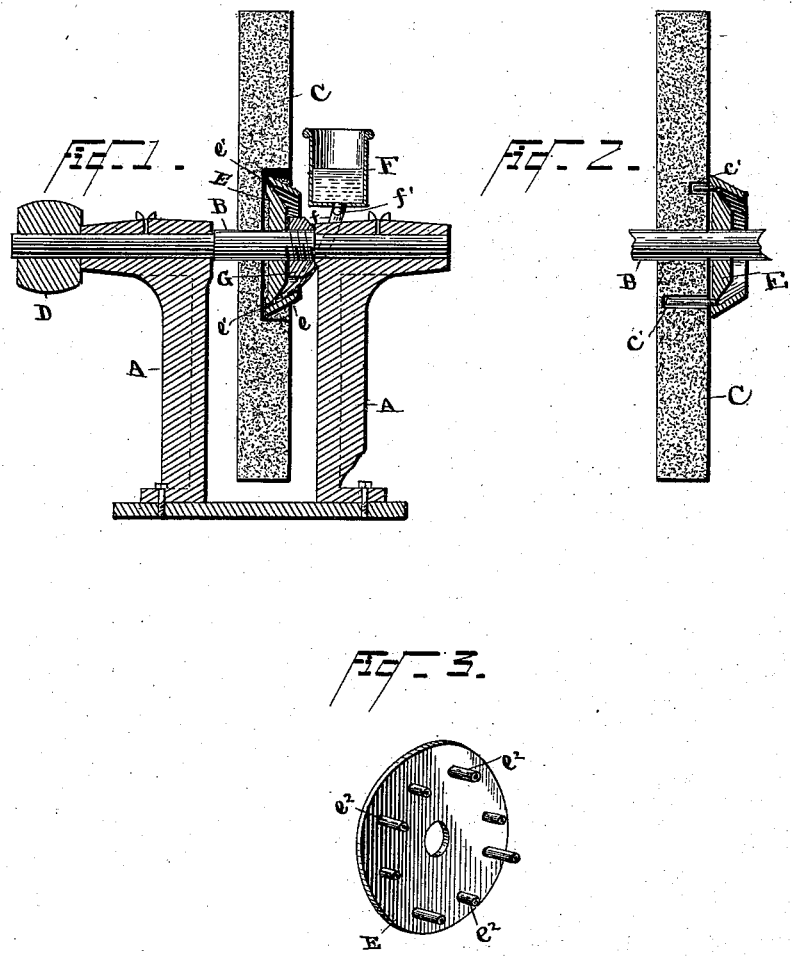
WITNESSES
Norris A. Clark.
Mortimer Redman
INVENTOR
William Cavert
by J. Deane.
his atty.

UNITED STATES PATENT OFFICE.

WILLIAM CAVERT, OF STERLING, ILLINOIS.

EMERY-WHEEL.

SPECIFICATION forming part of Letters Patent No. 376,854, dated January 24, 1888.

Application filed May 21, 1887. Serial No. 232,979. (No model.)

*To all whom it may concern:*

Be it known that I, WILLIAM CAVERT, a citizen of the United States, residing at Sterling, in the county of Whiteside and State of Illinois, have invented certain new and useful Improvements in Emery or Corundum Wheels; and I do hereby declare the following to be a full, clear, and exact description of the invention, such as will enable others skilled in the art to which it appertains to make and use the same.

Figure 1 is a side view, partly in section and partly in elevation, showing this device as in use. Fig. 2 is a sectional view of the wheel with the modified form of washer shown in Fig. 3. Fig. 3 is a detail in perspective of the washer, showing a modified construction of the same.

This invention relates to such improvement in corundum or emery wheels as shall enable them to be kept always in a uniform and proper degree of moisture for the purposes of use; and the novelty consists in such construction of the wheel and the combination therewith of certain parts, all as will now be more fully set out and claimed.

In the accompanying drawings, A and A denote any suitable support for the shaft B, upon which the corundum or emery wheel C is placed. Power is communicated to this shaft by means of the pulley D, over which a belt passes, leading to any desired driving agency. Centrally on the inner face or side of the wheel C, and with a radius of one-third, one-fourth, or one-fifth of the diameter of the wheel, or any that may be desired, is formed the circular depression or recess $c$. In this recess, and by means of a central hole which fits over the shaft B, is placed the washer E, its edges coming very close to the inner face of the recess $c$. This washer, which is in the form of a frustum of a cone or beveled at its edge, is hollow except at its base. Its edges $e$ project a little and are perforated or in the equivalent manner provided with nozzles $e'$. Near to the wheel, and on the same side with the rabbet or recess $c$, is the water-vessel F, suitably supported upon the frame A, and at such position relative to the washer E that the pipe $f$ from lower side of said water-vessel will communicate with the interior of the washer E, and thus a suitable amount of water to properly moisten the wheel can be supplied through the perforations $e'$ in the washer. The flow of water from the water-vessel can be properly regulated by means of the valve $f'$. It will thus be noted that in the revolution of the wheel and the washer together with it water is allowed to pass through the perforations $e'$ entirely around the inner face of the recess $c$, and will thus be communicated through the wheel by its pores.

Where a shop is supplied with water from public works it may sometimes be convenient to have the pipe $f$ merely connect with the spout of the water-pipe. In various ways, not necessary herein to recite, the mere mechanical details of the construction and adaptation of these parts to produce the results in the manner and form described above may be obtained without any essential variance from the invention as has above been set forth. The washer C is held in position on the shaft by the washer G, of the usual construction.

We may sometimes find it convenient, instead of cutting out a circular recess in one face of the wheel, to make a suitable number of holes, $c'$, in its inner face, as shown in Fig. 2, which holes may be of varying depth, and in these holes are placed the small pipes $e^2$ of the washer in the construction shown in Fig. 3, which pipes are made of varying lengths, and so adapted to fit into the several holes $c'$. The water-pipe $f$ communicates with the groove $e$ in the washer E in Fig. 2, like as has already been shown and described in the construction in Fig. 1.

It is obvious that the central depression or recess or holes in the face of the corundum-wheel may be made on either side.

Having now described my invention, what I consider new, and desire to secure by Letters Patent, is—

1. A corundum-wheel having a central circular depression in one side, combined with a hollow conical and perforated washer placed within said depression, substantially as and for the purposes set forth.

2. The combination, with a corundum-wheel, of a water-distributing washer having a circular conical recess provided with water-vents communicating with the wheel.

In testimony whereof I affix my signature in presence of two witnesses.

WILLIAM CAVERT.

Witnesses:
NORMAN CLARK,
T. P. BOWMAN.